3,751,501
TELOMERIZATION REACTIONS UTILIZING LIQUID HYDROCARBON SOLUTIONS OF CERTAIN ORGANOMETALLIC COMPLEXES
Conrad W. Kamienski and Joseph H. Merkley, Gastonia, N.C., assignors to Lithium Corporation of America, New York, N.Y.
No Drawing. Continuation-in-part of application Ser. No. 194,498, Nov. 1, 1971, which is a continuation-in-part of application Ser. No. 3,189, Jan. 15, 1970, now abandoned. This application Aug. 9, 1972, Ser. No. 279,005
Int. Cl. C07c 3/10
U.S. Cl. 260—668 B
28 Claims

ABSTRACT OF THE DISCLOSURE

Telomerization reactions wherein an aromatic hydrocarbon, such as toluene, is telomerized, in the presence of catalyst mixture or complex comprising, by way of illustration, (a) n-butylsodium or n-butylpotassium and (b) alkyllithiums such as n-butyllithium, by the gradual and controlled addition of monomers such as conjugated dienes and/or vinyl-substituted aromatic compounds, whereby to produce novel liquid resinous telomers.

---

This application is a continuation-in-part of application Ser. No. 194,498, filed Nov. 1, 1971, which is, in turn, a continuation-in-part of application Ser. No. 3,189, filed Jan. 15, 1970, said last-mentioned application being abandoned.

This invention relates to the preparation of novel and useful normally liquid (that is, liquid at room temperatures or about 20 to 25° C.) resins in the form of telomers and to a telomerization process for the production thereof in which said process is carried out under certain conditions and in the presence of certain organometallic complex catalysts in liquid hydrocarbon solvent media.

It is well known to the art that certain alkyllithiums or aryllithiums form complexes with corresponding alkyl- and aryl-alkali metal organometallics where the alkali metal is sodium, potassium, rubidium or cesium, illustrative examples of such complexes being represented by the following formulae:

$CH_3Li \cdot CH_2Me$; $n\text{-}C_4H_9Li \cdot n\text{-}C_4H_9Me$; $n\text{-}C_5H_{11}Li \cdot n\text{-}C_5H_{11}Me$;

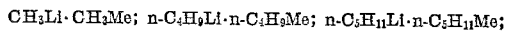

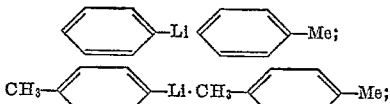

and

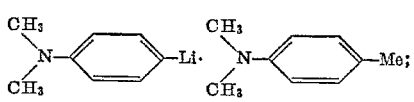

where Me is sodium, potassium, rubidium or cesium. (C. B. Wooster, Chem. Reviews, vol. XI, August 1932, "Organoalkali Compounds"; A. A. Morton, "Solid Organoalkali Metal Reagents," Gordon & Breach, New York, N.Y. 1964; Agnew. Chem. Internat. Edit., vol. 3, No. 4, 1964; R. A. Benkeser et al., Chem. Reviews, vol. 57, 1957, "Metalations with Organosodium Compounds"; M. Schlosser, "Newer Methods of Preparative Organic Chemistry," vol. V, Academic Press, 1968; M. Schlosser, "Activation of Organolithium Reagents," J. Organometal. Chem., vol. 8, (1967), pp. 9–16; Coates et al., "Organometallic Compounds," vol. I, 3rd ed., Methuen & Company, 1967; "Annual Surveys of Organometallic Chemistry," Seyferth and King, Elsevier, N.Y., 1964–1966; German Pat. No. 955,596; Paper by L. Lochmann et al., Tetrahedron Letters, pp. 257–262 (1966); and U.S. Pat. No. 3,294,768).

Various of the foregoing publications disclose complexes of the type referred to above and their use as metalating agents and polymerizing agents. The complexes themselves, as such, are generally pyrophoric and, therefore, difficult and dangerous to handle. The foregoing publications disclose the preparation of the complexes with ethers, notably diethyl ether, and the use thereof in ether media, and, in certain cases, also, the isolation of said complexes. Such ether complexes are generally quite unstable.

One aspect of the discoveries which have been made in accordance with the present invention may be considered in connection with the fact that complexes of alkyllithiums with alkylsodiums or alkylpotassiums, exemplified by n-butylsodium and n-butylpotassium, are, as indicated above, conventionally prepared in ethers, such as diethyl ether and tetrahydrofuran, said complexes being used for carrying out various reactions. However, such complexes react with ethers, in some cases rather readily, and, therefore, they are relatively unsatisfactory. When these complexes are formed in the presence of major quantities of liquid hydrocarbon solvents, such unwanted side reactions are avoided. The presence of small proportions of ethers is not excluded in the practice of our invention although, generally, it is not necessary to employ them and it is more desirable to avoid their use.

The complexes which are dissolved, or formed in solution, in the liquid hydrocarbon solvents for use in the practice of the present invention are made from one or more $C_2$–$C_{18}$ alkyllithiums, or other organolithium compounds indicated below, in admixture with alkylmetallics of at least one of the metals sodium, potassium, rubidium and cesium, particularly sodium and potassium and, in certain cases, especially potassium.

It is particularly advantageous to utilize, as the organometallic compounds of the compositions or complexes or the like which are used in the telomerization method of the present invention, as hereafter described in detail, (a) $C_3$–$C_6$ alkyllithium compounds in admixture with (b) $C_3$–$C_6$ alkylmetallic compounds in which the metals of said alkylmetallic compounds are one or more from group of sodium, potassium, rubidium and cesium, especially the n-butylmetallic compounds. However, in one aspect of the broader phases of the invention, the organometallic compounds employed in the production of the compositions or complexes or the like utilized in the practice of the present invention can comprise $C_2$–$C_{18}$ hydrocarbon organo radicals, said organo radicals being, for instance, cycloalkyl, cycloalkenylalkyl, arylalkyl, arylcycloalkyl, cycloalkylaryl, arylcycloalkyl, and the like. Still other types of organo radicals that can be used are those of heterocyclic character, such as 2-pyridyl and 2-thienyl; ethylenically unsaturated organo radicals such as vinyl, allyl and propenyl; polyfunctional organo radicals such as alkylene and polymethylenes as, for example, 1,4-tetramethylene and 1,5-pentamethylene, and those derived by addition of alkali metals and alkyllithiums to conjugated polyene hydrocarbons such as isoprene, 1,3-butadiene and 1,3-divinylbenzene (see, for instance, U.S. Pats. Nos. 3,294,768; 3,388,178 and 3,468,970). Many of the said organometallic compounds which are utilized to produce the compositions or complexes can be represented by the formula

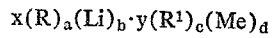

where R and $R^1$ are the same or dissimilar $C_2$–$C_{18}$ hydrocarbon organo radicals; Me is one or more metals selected from the group of sodium, potassium, rubidium and cesium; $x$ and $y$ are integers reflecting the molar ratios of the respective organometallic compounds comprising the compositions or complexes, the values of $x$ and $y$ commonly involved being indicated hereafter; and $a$, $b$, $c$ and $d$ are integers, generally from 1 to 3. Illustrative examples of said hydrocarbon organo radicals, in addition to those previously mentioned, are n-propyl; n-butyl; sec-butyl; n-amyl; tert-amyl; n-octyl; n-undecyl; n-decyl; n-dodecyl; 2-methyl-2-butenyl; cyclopentyl-methyl; cyclohexyl-ethyl; cyclopentyl-ethyl; methylcyclopentyl-ethyl; 4-cyclohexenyl-ethyl; alphanaphthyl-ethyl; cyclopentyl; cyclohexyl; methylcyclopentyl, dimethylcyclopentyl; ethylcyclopentyl; methylcyclohexyl; dimethyl-cyclohexyl; ethylcyclo-hexyl; isopropylcyclohexyl; phenylethyl; phenylcyclohexyl; phenyl; tolyl; xylyl; benzyl; naphthyl; methylnaphthyl; dimethylnaphthyl; ethylnaphthyl; cyclohexylbutyl; 2,7-dimethylocta-2,6-dien-1,8-yl; 2,6-dimethylocta-1,6-dien-1,8-yl; and bis (α-2-methylbutyl)-m-xylyl.

The compositions or complexes can be of binary character, as in the case, for example, of n-butyllithium·n-butylsodium or n-butyllithium·n-butylpotassium; or of ternary character, as in the case, for example, of n-butyllithium·butylsodium·n-butyl - potassium or n - butyllithium·n - butylpotassium·n - butylcesium. Compositions or complexes of quaternary character can also be prepared and utilized.

As indicated above, the aforesaid compositions or complexes are employed in the form of solutions thereof in one or more liquid hydrocarbon solvents. Among such solvents are, by way of illustration, heptane, hexane, octane, isooctane, cyclohexane, methylcyclohexane, benzene, toluene, xylenes, and compatible mixtures of any two or more thereof. It will be understood, of course, that the different complexes will have varying solubilities in different liquid hydrocarbon solvents. However, in general, they will be found to be soluble to a substantial extent in at least most of said liquid hydrocarbon solvents to produce clear solutions. Where reference is made to solubility or insolubility in a given liquid hydrocarbon solvent, the term "equivalents" of organometal(s) per liter of solution is used to denote concentration. Thus, by way of illustration, 1 molar equivalent of n-butyllithium dissolved in 1 liter of hexane will dissolve 0.1 molar equivalent of n-butylsodium, while 1.05 molar equivalents of n-butyllithium dissolved in 1 liter of benzene will dissolve 0.35 molar equivalents of n-butylsodium. Alkylpotassiums are generally less readily dissolved. The following Table I shows the solubility relationships of these various complexes:

Both alkylsodiums and alkylpotassiums form solid complexes with alkyllithiums containing an average of two equivalents of alkyllithium per equivalent of alkylsodium or alkylpotassium. It appears, however, that this molar ratio does not represent a single 2:1 complex, but, rather, represents a combination of at least two complexes, one of which is considerably more hydrocarbon-soluble than the other. For example to some extent, dependent upon the rate of mixing and/or the concentration of the reactants, either a 1:1 or higher (1.8–2.5:1) solid complex of n-butyllithium and n-butylpotassium forms on reaction of three equivalents of n-butyllithium with one equivalent of potassium tert-butoxide in hexane. When the solid 1:1 complex forms in hexane, the supernatant solution contains a 4:1 ratio of n-butyllithium to n-butylpotassium. Treatment of the solid 1:1 complex with benzene dissolves not the 1:1 ratio of the two reagents, but a 4:1 ratio of the reagents. Again, when a 2:1 solid complex is formed in hexane, only a portion of the solids dissolves readily in benzene. The residue from this treatment does not dissolve appreciably even in a large excess of the solvent. Apparently then, complexes containing ratios of RLi to RK greater than one are actually mixtures of at least two complexes, one of which is the 1:1 complex and quite insoluble in hydrocarbon solvents. The other solid complex formed appears to be of the approximately 4:1 type and is quite soluble in hydrocarbon solvents such as hexane and benzene. A similar situation obtains with n-butyllithium complexes of n-butylsodium, a 3:1 complex being the soluble form in hexane, and a 6:1 or higher complex being soluble in hexane and in toluene. The solid complexes, as such, as well as in solution in liquid hydrocarbon solvents, are highly effective as catalysts in telomerization reactions such as are described below.

The following solid organometal complexes have also been prepared:

$$(n-C_4H_9Li)_2 \cdot (n-C_4H_9Na)$$

$$(C_{10}H_{14}Li_2)_{1.2} \cdot (n-C_4H_9Na)$$

$$(C_{10}H_{14}Li_2)_{2.4} \cdot (C_{10}H_{14}K_2)$$

The $C_{10}H_{14}Li_2$ and the $C_{10}H_{14}K_2$ compounds forming a part of the aforesaid complexes are dilithioadducts of isoprene prepared in the manner described in Example 1 of U.S. Pat. No. 3,388,178, the potassium compound being made by replacing lithium by the stoichiometric equivalent of potassium. As can be seen from Table I, the compositions of the complexes in solution is different from that in the solid state.

As can be seen from the above table, and in view of what has been stated above, it is clear that not all of the compositions or complexes are soluble in all liquid hydrocarbon solvents or to an equal extent in any particular liquid hydrocarbon solvent. Thus, for instance, various of said compositions or complexes will be found to be highly soluble in aliphatic or cycloaliphatic liquid hydrocarbon or alkane solvents such as hexane, heptane, and isooctane, and cycloaliphatic solvents such as cyclohexane and cyclooctane. Others will be found to be highly soluble in aromatic liquid hydrocarbon solvents such as benzene or toluene and insoluble or slightly soluble in aliphatic or cycloaliphatic liquid hydrocarbon solvents. Still others will be found to be soluble in both types of the aforesaid liquid hydrocarbon solvents or mixtures of two or more thereof. However, in all instances the compositions or complexes will be found to be soluble in one or more liquid hydrocarbon solvents or mixtures of two or more thereof.

The soluble metalorganic complexes referred to above will thus have compositions in which the organolithium to (other) organoalkali molar ratios will vary considerably depending on the nature of the organoradicals involved (see Table I). Generally, these ratios will vary from about 2:1 to about 10:1 for complexes containing alkyl groups such as n-butyl-, sec-butyl-, or n-amyl-, but may be as high as about 100:1, 500:1 and even as high

TABLE I

| | Solubility of organometal complexes in— | | | | | |
|---|---|---|---|---|---|---|
| | Hexane | | Benzene | | Toluene | |
| | Conc. (N) | x:y | Conc. (N) | x:y | Conc. (N) | x:y |
| $(n-C_4H_9Li)_x \cdot (n-C_4H_9Na)_y$ | 1.01 | 10:1 | 1.4 | 3:1 | 1.0 | 7:1 |
| $(n-C_4H_9Li)_x \cdot (n-C_4H_9K)_y$ | 1.01 | 4:1 | 0.11 | 4:1 | | |
| $(C_{10}H_{14}Li_2)_x \cdot (n-C_4H_9Na)_y$ [1] | | | 0.83 | 60:1 | | |
| $(C_{10}H_{14}Li_2)_x \cdot (C_{10}H_{14}K_2)_y$ [1] | | | 0.79 | 268:1 | | |

[1] Formed by the addition-dimerization reaction of lithium metal with an equivalent of isoprene in dimethyl etherbenzene, as described in U.S. Patent No. 3,388,178.

as about 1000:1 for complexes containing one or two organo groups derived from the addition of alkali metals to conjugated polyenic hydrocarbons such as 1,3-butadiene or isoprene. Especially preferred ratios utilized as described below are those in which the molar ratios of organolithium to other organoalkali vary from about 3:1 to about 10:1.

The above described hydrocarbon-soluble alkyllithium complexes have been found to be highly useful as catalysts in telomerization reactions to produce the novel normally liquid resin telomers when such reactions are carried out in the manner described hereafter.

In the practice of our invention, in order to obtain the particular normally liquid resin telomers with which our invention is concerned, it is essential that the conjugated diene monomer and/or vinyl-substituted aromatic taxogen compound be added in a gradual and controlled manner to a liquid hydrocarbon solution of a normally liquid aromatic hydrocarbon telogen, such as toluene, or the said normally liquid aromatic hydrocarbon telogen may be used without the addition of any other normally liquid hydrocarbon, in the presence of the aforesaid catalyst complex.

The preparation of normally liquid conjugated diene polymers has heretofore been suggested, in the aforementioned U.S. Pat. No. 3,294,768, by polymerizing a conjugated diene, such as 1,3-butadiene, or a mixture of 1,3-butadiene and styrene, in a hydrocarbon diluent, which may be propane, isooctane, cyclohexane, benzene, toluene, xylene or the like, in the presence of certain catalysts by varying the amount of the catalyst employed. The catalysts shown by said patent comprise, for instance, mixtures of (a) alkyllithiums with (b) organosodium, organopotassium, organorubidium or organocesium compounds as, for example, methylsodium, tert-butylsodium, phenylsodium, ethylpotassium, cyclohexylrubidium or isopropylcesium; or, alternatively, the catalyst can be preformed in situ by adding, illustratively, a butyllithium solution to potassium tert-butoxide in cyclohexane. In any event, the monomer or monomers are charged into a reactor containing the catalyst and the hydrocarbon diluent, or the alternative procedures described in column 6, second paragraph of said patent are followed.

In U.S. Pat. No. 3,356,754, a modified procedure is described in which normally liquid conjugated diene polymers, or copolymers with vinyl-substituted aromatic compounds, are produced not by using high catalyst levels as is U.S. Pat. No. 3,294,768, but, rather, by carrying out the polymerization reaction, utilizing the same catalyst systems as described in U.S. Pat. No. 3,294,768, in the presence of a diluent comprising at least 30 weight percent of an alkyl-substituted aromatic hydrocarbon, for instance, toluene. As shown in said U.S. Pat. No. 3,356,754, the polymerization reaction is carried out by first charging the diluent, such as toluene, to a reaction vessel, then charging the conjugated diene, then adding the catalyst, in the form of solution or otherwise, and then allowing the reaction to proceed at the selected temperature and for the selected time period.

While the procedures of the foregoing U.S. Pats. Nos. 3,294,768 and 3,356,754 produce normally liquid polymers, they are different from and do not possess the desired properties and characteristics of the normally liquid resin telomers of our invention. To achieve the products of our invention, it is essential that the conjugated diene monomer taxogen, such as 1,3-butadiene, and/or the vinyl-substituted aromatic compound taxogen, such as α-methylstyrene, be added gradually and in a controlled manner to the solution comprising the normally liquid aromatic hydrocarbon telogen and the catalyst, as distinguished from the procedures of the aforesaid U.S. Pats. Nos. 3,294,768 and 3,356,754, where the totality of the conjugated diene and/or vinyl-substituted aromatic hydrocarbon is admixed with the liquid hydrocarbon diluent and the catalyst. Various of the differences between the normally liquid resin telomers of our invention and those of the said patents will be pointed out hereafter.

In the practice of our invention, it is particularly desirable to utilize, as the catalyst system, compositions or complexes formed from the alkyllithiums with the organopotassium compounds, notably the alkylpotassiums and especially n-butylpotassium, particularly for the telomerization of toluene with 1,3-butadiene. The resulting butadiene telomers have an unusually high percentage of unsaturation (commonly in excess of 95%) coupled with a relatively low viscosity for the same molecular weight range. Unsaturation is essentially mainly of the vinyl and trans-1,4 types (little cis-1,4). Cyclic structures are generally very low (less than 5%), apparently due to the high proportion of trans-1,4 linkages which result from the practice of this aspect of the present invention. In this particular situation, it may be noted that the foregoing effects are not obtained with the compositions wherein alkylsodiums are complexed with the alkyllithiums. Table II shows such relationships, and Table III shows the corresponding properties of such telomers.

TABLE II.—MICROSTRUCTURE OF BUTADIENE TELOMERS

| Catalyst type | Percent | | | |
|---|---|---|---|---|
| | Vinyl | Trans-1,4 | Cis-1,4 | Sat'd |
| n-Butyllithium | 68.9 | 7.6 | 0.0 | 23.5 |
| (n-$C_4H_9$Li)$_3$:n-$C_4H_9$Na | 77.8 | 1 | 1 | 22.2 |
| (n-$C_4H_9$Li)$_2$:n-$C_4H_9$K | 50.1 | 42 | 1 | 8.6 |

TABLE III.—PHYSICAL PROPERTIES AND YIELDS OF BUTADIENE TELOMERS

| Catalyst type | Viscosity | Molecular weight | Yield (lbs./eq.) |
|---|---|---|---|
| n-$C_4H_9$Li | {120 poise (50° C.), 2,000 poise (23° C.)} | 2,130 | 27 |
| (n-$C_4H_9$Li)$_3$:(n-$C_4H_9$Na) [1] | 37.7 poise (27° C.) | 1,004 | 29.2 |
| (n-$C_4H_9$Li)$_2$:(n-$C_4H_9$K) | 12.4 poies (23° C.) | 1,410 | 123 |

[1] Catalyst became inactivated during reaction after 1.5 hrs.

NOTE.—Reaction conditions:
Toluene, ml _____ 400
TMEDA (tetramethylethylenediamine), ml _____ 5
Catalyst, eq _____ 0.034
Butadiene (gas), 1/min _____ 3.5
Temperature, ° C _____ 60–65
Time, hours _____ 2–2.5

It will be noted that the yield of telomer is radically higher with the alkyllithium-alkylpotassium complex than with other catalysts listed (of the order of 100 lbs. of telomer per equivalent of catalyst or more). It is possible that such higher yields of telomer may be at least partly due to the decreased viscosity of the telomers produced, allowing for good contact between butadiene and growing chain-ends which prevents a butadiene build-up leading to polymerization rather than desired telomerization during the reaction.

It is also desirable, in certain instances, to utilize, in the reaction medium in which the telomers of the present invention are produced, certain types of catalysts, namely, Lewis base ethers and aliphatic tertiary amines. Illustrative examples of such ethers are linear alkyl ethers such as dimethyl ether, diethyl ether, diisopropyl ether, di-n-butyl ether and diisobutyl ether; dialkyl ethers of aliphatic polyhydric alcohols such as dimethyl ether of ethylene glycol, diethyl ether of ethylene glycol, diisopropyl ether of ethylene glycol and diisopropyl ether of diethylene glycol, and dimethyl-, diethyl- and diisopropyl ethers of propylene glycol; cyclic alkyl ethers such as tetrahydrofuran (THF), tetrahydropyran (THP), dioxane, and 7-oxa [2,2,1]bicycloheptane (OBM); and liquid ethers in the form of azaoxa-alkanes, azo-alkyloxacycloalkanes or oxa-alkylazacycloalkanes which can be represented by the formulae:

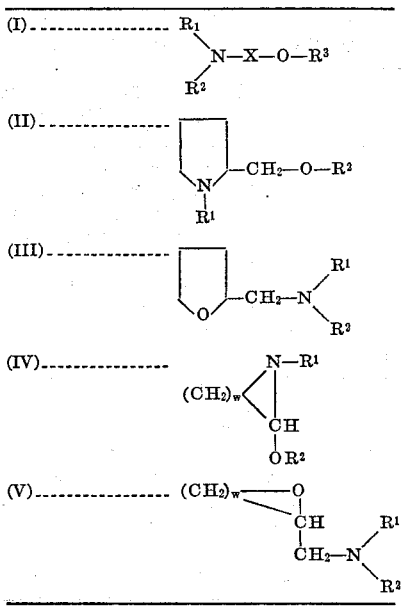

where $R^1$, $R^2$ and $R^3$ are the same or different alkyls each containing from 1 to 4 carbon atoms, namely, methyl, ethyl, n-propyl, isopropyl, n-butyl, isobutyl and tert-butyl; X is a non-reactive group as $-CH_2CH_2-$,

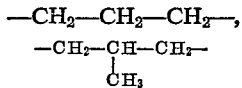

or other divalent aliphatic hydrocarbon or alkylene radicals, preferably containing from 2 to 4 carbon atoms; and $w$ is 1 to 4. Illustrative examples of such ethers include, for instance, 2-dimethylaminoethylmethyl ether $[(CH_3)_2-N-CH_2-CH_2-O-CH_3]$; 2-dimethylaminoethylmethyl ether $[(C_2H_5)_2-N-CH_2-CH_2O-CH_3]$; and 2-dimethylaminopropylmethyl ether $$[(CH_3)_2-N-CH_2-CH_2-CH_2-O-CH_3].$$

An illustrative dioxacycloalkane is 2,2′di (tetrahydrofuranyl)

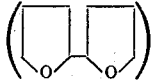

The Lewis base aliphatic tertiary amines include, by way of illustration, trimethylamine, triisopropylamine and tributylamine; and ditertiary amines such as N,N,N′,N′-tetramethylenediamine. Other suitable Lewis base tertiary amines which can be utilized are disclosed in U.S. Pat. No. 3,206,519 and British Pat. No. 1,051,269 which, for this showing, are herewith incorporated by reference. Especially suitable, where such cocatalyst is used, are N,N,N′,N′-tetramethylethylenediamine (TMEDA) and 1-dimethylamino - 2 - ethoxyethane (2-dimethylaminoethyl ethyl ether).

The present invention makes possible, in a simple and effective manner, the production of normally liquid telomers of approximately predetermined molecular weight so that telomers can be produced to meet any of a number of particular needs. It is highly advantageous to be able reasonably readily to control a process so as to produce liquid telomers of low, high or intermediate molecular weight. Thus, for certain applications such as "potting" or "casting," liquid telomers of relatively high molecular weight, for instance, about 1500 to about 3000, are desirable to obtain good cures. On the other hand, for certain other applications, such as pollution-free paints and coatings, distinctly lower molecular weight liquid telomers, for instance, about 145 to about 460, are particularly useful since it is unnecessary to resort to the use of admixed solvents to effect lowering of viscosity. There are many other utilities for low molecular weight telomers as, for instance, plasticizers for rubbers, alkylates, and the production of biodegradable synthetic detergents.

The control of the molecular weight of the normally liquid telomers produced in accordance with the present invention can be effected by varying the catalyst and by processing variables. Thus, by way of example, a low molecular weight telomer of 1,3-butadiene, with toluene, can be obtained by using one or more of the following approaches: (1) utilizing a catalyst, of the character described above, with a low ratio of lithium to potassium, for instance, 1:1 or less than 1:1; (2) using a high reaction temperature, for example, 100° C.; (3) utilizing a slow 1,3-butadiene feed rate, for instance, 1.7 liters per minute; (4) utilizing a high telogen concentration, for instance, or pure toluene; (5) utilizing a cocatalyst, such as tetramethyl ethylenediamine, and in increasing amounts when the catalyst type is $$(n\text{-}C_4H_9Li)\cdot(n\text{-}C_4H_9K);$$

and using no such cocatalyst or decreasing amounts thereof when the catalyst type is the mixed lithium-potassium adduct of isoprene $(C_{10}H_{14}Li_2\cdot C_{10}H_{14}K_2)$, for instance, ratios between 1 and 2 for the $C_{10}H_{14}Li_2$ and less than 1 for the $C_{10}H_{14}K_2$. Conversely, a relatively high molecular weight normally liquid telomer can be produced by changing any one or more of these variables in the opposite direction to that set forth above. In general, the weight ratios of the conjugated diene taxogen, particularly 1,3-butadiene, and/or vinyl-substituted aromatic hydrocarbon taxogen, to the aromatic hydrocarbon telogen, particularly toluene, used in the production of the normally liquid telomers of our invention, fall within the range of about 1:1 to about 10:1. In said telomers, for instance, those derived from toluene as the telogen and 1,3-butadiene as the taxogen, there is approximately one phenyl group per butadiene polymer chain. The molecular weight distribution of the normally liquid telomers of our invention generally falls within the range of 2 to 6, especially desirable being those with a molecular weight distribution between about 3 and 4. Molecular weight distribution for comparative purposes is defined herein as the width of the Gel Permeation Chromatographic curve of the liquid telomer taken at one-half its height from the base line of the curve. The shape of the distribution curves of the particularly preferred normally liquid telomers of our invention, though broad, is approximately Gaussian.

Tables IV, V, VI and VII provide additional examples of the effect of varying the process conditions. Table VIII shows typical properties of normally liquid telomers with three different molecular weight ranges as produced pursuant to the teachings contained herein.

TABLE IV.—EFFECT OF BUTADIENE FEED RATE ON MOLECULAR WEIGHT OF TELOMERS

| Reaction No.[1] | Catalyst type [2] | Feed rate (l./min.) | $\overline{M}_n$ | Yield (lbs./eq. C-M) |
|---|---|---|---|---|
| 2,033 | $C_{10}H_{14}Li_2\cdot C_{10}H_{14}K_2$ | 1.7 | 475 | 106 |
| 1,955 | $C_{10}H_{14}Li_2\cdot C_{10}H_{14}K_2$ | 3.4 | 577 | 82 |
| 2,026 | $C_{10}H_{14}Li_2\cdot C_{10}H_{14}K_2$ | 10.0 | 975 | 120 |
| 1,983 | n-$C_4H_9$Li·n-$C_4H_9$K | 3.4 | 400 | 110 |
| 2,025 | n-$C_4H_9$Li·n-$C_4H_9$K | 10.0 | 1,860 | 104 |

[1] Reaction temperature, 55° C.
[2] TMEDA added equivalent to C-M present.

TABLE V.—EFFECT OF REACTION TEMPERATURE ON MOLECULAR WEIGHT OF TELOMERS

| Reaction No.[1] | Catalyst type [2] | Reaction temp., °C. | $M_n$ | Yield (lbs./eq. C-M) |
|---|---|---|---|---|
| 2,030 | $C_{10}H_{14}Li_2 \cdot C_{10}H_{14}K_2$ | 110 | 420 | 83 |
| 1,955 | $C_{10}H_{14}Li_2 \cdot C_{10}H_{14}K_2$ | 65 | 577 | 82 |
| 2,035 | $C_{10}H_{14}Li_2 \cdot C_{10}H_{14}K_2$ | 40 | 1,850 | 102 |
| 2,028 | $n\text{-}C_4H_9Li \cdot n\text{-}C_4H_9K$ | 110 | 690 | 130 |
| 2,031 | $n\text{-}C_4H_9Li \cdot n\text{-}C_4H_9K$ | 40 | 1,500 | 114 |

[1] Butadiene feed rate, 3.4 liters per minute.
[2] TMEDA added equivalent to C-M present.

TABLE VI.—EFFECT OF LITHIUM-POTASSIUM RATIO ON MOLECULAR WEIGHT OF TELOMERS

| Reaction No.[1] | Catalyst type [2] | Li/K | Molecular weight ($M_n$) | Yield (lbs./eq. C-M) |
|---|---|---|---|---|
| 1,983 | $n\text{-}C_4H_9Li \cdot n\text{-}C_4H_9K$ | 1.0 | 400 | 110 |
| 1,991 | $(n\text{-}C_4H_9Li)_2 \cdot n\text{-}C_4H_9K$ | 2.0 | 684 | 127 |
| 1,994 | $(n\text{-}C_4H_9Li)_3 \cdot n\text{-}C_4H_9K$ | 3.0 | 807 | 100 |
| 1,995 | $C_{10}H_{14}Li_2 \cdot C_{10}H_{14}K_2$ | 1.0 | 577 | 82 |
| 2,003 | $(C_{10}H_{14}Li_2)_2 \cdot C_{10}H_{14}K_2$ | 2.0 | 775 | 80 |

[1] Reaction temperature, 65° C.; butadiene flow rate, 3.4 liters/min.
[2] TMEDA added equivalent to C-M present.

TABLE VII.—EFFECT OF COCATALYST-CATALYST RATIO ON MOLECULAR WEIGHT OF TELOMERS

| Reaction No.[1] | Catalyst type | TMEDA/C-M | Molecular weight ($M_n$) | Yield (lbs./eq. C-M) |
|---|---|---|---|---|
| 2,011 | $(n\text{-}C_4H_9Li)_2 \cdot n\text{-}C_4H_9K$ | 2.0 | 430 | 130 |
| 1,991 | $(n\text{-}C_4H_9Li)_2 \cdot n\text{-}C_4H_9K$ | 1.0 | 684 | 127 |
| 2,010 | $(n\text{-}C_4H_9Li)_2 \cdot n\text{-}C_4H_9K$ |  | 807 | 135 |
| 2,015 | $C_{10}H_{14}Li_2 \cdot C_{10}H_{14}K_2$ | 2.0 | 795 | 127 |
| 1,995 | $C_{10}H_{14}Li_2 \cdot C_{10}H_{14}K_2$ | 1.0 | 577 | 82 |
| 2,016 | $C_{10}H_{14}Li_2 \cdot C_{10}H_{14}K_2$ |  | 420 | 110 |

[1] Reaction temperature, 65° C.; butadiene flow rate, 3.4 liters/min.

TABLE VIII.—TYPICAL PROPERTIES OF TELOMER SERIES

|  | A | B | C |
|---|---|---|---|
| Chemical composition: |  |  |  |
| Terminal phenyl | 8-19 | 5-8 | 2-5 |
| Polybutadiene | 92-81 | 95-92 | 98-95 |
| Microstructure of polybutadiene: |  |  |  |
| Vinyl | 45-55 | 45-55 | 45-55 |
| Trans-1,4 | 30-40 | 30-40 | 30-40 |
| Cis-1,4 | 5-20 | 5-20 | 5-20 |
| Cyclic | <5 | <5 | <5 |
| Molecular weight | 400-1,000 | 1,000-1,500 | 1,500-3,000 |
| Physical state | [1] Oil | Oil | Oil |
| Viscosity (25° C.) (Engler), poises | 0.4-3.0 | 3-15 | 10-150 |
| Iodine number | 450 | 450 | 450 |
| Low boilers, percent | <1 | <1 | <1 |
| Density 20° C | ca. 0.9 | ca. 0.9 | ca. 0.9 |
| Pour point, ° C | <-50 | -35--50 | -20--40 |

[1] Very fluid.

The following examples are illustrative of the production of compositions or complexes and their use in telomerization reactions, all in accordance with the present invention. It will be understood that other compositions or complexes can be made and other telomerizations carried out in the light of the guiding principles and teachings disclosed herein. All temperatures are in degrees C.

EXAMPLE I

Preparation of solid 2:1 n-butyllithium·n-butylsodium complexes

To a 1 liter, argon-swept, 3-necked, cleaved Morton flask equipped with a Cole-Parmer high speed (20,000 r.p.m.) stirrer, argon inlet tube, 125 cc. graduated dropping funnel, and thermometer, was added 41.6 g. of a 30 wt. percent Li metal dispersion in paraffin wax (12.5 g., 1.79 g.-atoms Li metal containing 2 wt. percent of Na metal) and 500 ml. of pure grade n-heptane. The mixture was stirred thoroughly and heated to 36° to dissolve the paraffin wax. Two ml. of a total charge of 87 ml. (75.5 g., 0.815 mole) of n-butyl chloride was added to the mixture in the flask to initiate the reaction. The temperature rose to 41° and addition of the organic halide was continued over a 90-minute period, keeping the temperature between 20 and 30° throughout. After the halide addition was complete, 136.4 g. of a 30 wt. percent sodium dispersion in mineral oil (1.78 g. atoms of Na metal) was added to the reaction flask and an additional 87 ml. of n-butyl chloride slowly added to the stirred mixture over a 1-hour period. The residue was allowed to settle overnight and the solution (670 ml., 1.58 M) filtered away. The solid residue was washed once with heptane and the wash filtered off (110 ml., 1.38 N). The combined filtrates represented a total yield of n-butyl-metallics of 74.2% based on n-butyl chloride. The solution slowly deposited well-defined needle-like crystals on standing for two days at room temperature. These crystals were filtered off, washed three times with small amounts of n-heptane, then once with n-pentane, and were blown dry on a filter plate with a stream of dry argon (total weight=1.86 g.). The crystals were slurried in 50 ml. of n-heptane and decomposed slowly with 50 ml. of absolute methyl alcohol. Distilled water was added, the layers separated, and the upper layer washed with distilled water. The combined aqueous layers (202 ml.) contained 0.0269 g. eq. of alkaline products, indicating a neutralization equivalent for the crystals of 69.2 (theory for $(n\text{-}C_4H_9Li)_2 \cdot n\text{-}C_4H_9Na = 66.1$)

Flame photometry of the combined aqueous layers showed a Li:Na ratio (atomic) of 2.2:1. The filtrate from the $(n\text{-}C_4H_9Li)_2 \cdot n\text{-}C_4H_9Na$ crystals was found to possess a 10.4:1 Li:Na atomic ratio (8.8 mole percent $n\text{-}C_4H_9Na$ present based on the total alkalinity in solution). It is well known that $n\text{-}C_4H_9Na$ alone possesses no solubility in this medium.

EXAMPLE II

Preparation of hydrocarbon-soluble n-butyl-lithium·n-butylsodium complexes (a) From $n\text{-}C_4H_9Na$ (prepared from n-butylchloride and sodium metal, and $n\text{-}C_4H_9Li$).—$n\text{-}C_4H_9Na$ was prepared by reacting 40 g. of a 50 wt. percent sodium dispersion (20 g., 0.87 g. atom) in mineral oil, suspended in 350 ml. of hexane, with n-butylchloride at 30°. The resulting blue-black mixture was extracted with 445 ml. of 0.90 N $n\text{-}C_4H_9Li$ in n-hexane. At 20°, the Li:Na ratio in the supernatant solution was 7.8:1. On warming the mixture to 30°, the ratio dropped to 6.1:1 indicating an increased solubilization of $n\text{-}C_4H_9Na$.

(b) From sodium tert-butoxide and $n\text{-}C_4H_9Li$.—To 0.8 g. (0.0033 mole) of sodium tert-butoxide in hexane was added sufficient concentrated $n\text{-}C_4H_9Li$ (0.0083 mole) to yield soluble lithium tert-butoxide and insoluble $n\text{-}C_4H_9Na$. The supernate of hexane and lithium-tert-butoxide was decanted away and the precipitate washed with hexane. Then, 0.0249 mole of concentrated $n\text{-}C_4H_9Li$ in 25 ml. of benzene was added to the precipitate to give a clear, light yellow solution of $(n\text{-}C_4H_9Li)_3 \cdot n\text{-}C_4H_9Na$

EXAMPLE III

Preparations of n-butyllithium·n-butylsodium complexes in benzene (a) A volume of 8.8 ml. of a 1.02 N (0.0090 mole) $n\text{-}C_4H_9Li$ solution in benzene was added to a weight of 0.355 g. (0.0044 mole) of $n\text{-}C_4H_9Na$ and the mixture shaken until solution was complete. The product was centrifuged and the clear supernatant solution analyzed for total alkalinity, Li and Na (by flame photometry). The solution was found to be 1.38 N in total alkalinity, representing a molar ratio of Li:Na of 2.8. Flame photometry also showed the ratio of Li to Na in solution to be 2.8. (A dissolution of the major portion of the $n\text{-}C_4H_9Na$ present occurred.)

(b) In a second experiment, 6.8 ml. of a 0.51 N $n\text{-}C_4H_9Li$ solution in benzene was mixed with 0.137 g. of $n\text{-}C_4H_9Na$. Flame photometry of the clear supernatant solution showed the ratio of Li to Na in solution to be 2.5.

EXAMPLE IV

Preparation of n-butyllithium·n-butylpotassium complex

To 1.35 g. (0.012 mole) of potassium tert-butoxide in 125 ml. of hexane was added 3.2 ml. of concentrated (90 wt. percent) n-C$_4$H$_9$Li (0.036 mole). The mixture was stirred for 24 hours. It was then washed thoroughly with hexane to remove by-product lithium tert-butoxide.

The complex remaining dissolved in the hexane wash yielded an approximately 4:1 ratio of n-C$_4$H$_9$Li to n-C$_4$H$_9$K (ca. 1 N). The complex when washed with benzene was still 4:1, but the solubility was only about 0.1 N. The residual solid, on analysis, showed a ratio of Li to K of 1.2:1.

EXAMPLE V

Preparation of complex of dilithioadduct of isoprene (DiLi-1) with butylsodium (BuNa)

To 1.24 g. (0.0155 mole) of n-C$_4$H$_9$Na was added 40 ml. of a 1.54 N solution of C$_{10}$H$_{14}$Li$_2$ in benzene (0.062 mole). The mixture was stirred for 0.5 hour. The resulting solids were separated from the supernate by centrifugation. Analysis showed the solids to have a Li to Na ratio of 1.2 to 1. The dissolved complex in the benzene had a Li to Na ratio of 60 to 1.

EXAMPLE VI

Preparation of complex of dilithioadduct of isoprene (DiLi-1) with dipotassioadduct of isoprene (DiK-1)

To 1.68 g. (0.015 mole) of potassium tert-butoxide was added 0.077 equivalent of C$_{10}$H$_{14}$Li$_2$ in benzene. The mixture was stirred for 24 hours. The solids, separated from the solution, had a Li to K ratio of 2.4 to 1. The soluble complex in the supernate had a Li to K ratio of 268 to 1.

EXAMPLE VII

Telomerization of 1,3-butadiene with toluene using an "in situ" n-butyllithium·n-butylpotassium complex and TMEDA as a cocatalyst To 400 ml. of toluene was added 1.35 g. (.012 mole) of potassium tert-butylalcoholate and 3.2 ml. (.036 mole) of concentrated (90%) n-C$_4$H$_9$Li. After 0.5 hour of stirring, to the solid orange complex of $$(n\text{-}C_4H_9Li)_2 \cdot n\text{-}C_4H_9K$$

was added 5 ml. of TMEDA. (The lithium-tert-butylalcoholate formed above was not removed.) 1,3-butadiene was added as a gas at a flow rate of 3.5 liters/min. The temperature rose immediately from 25–60° and was maintained at 60–65° throughout the reaction with external cooling. After 3 hours, 2 ml. of water were added. The telomeric product was stripped of toluene under reduced pressure. The product, a pale yellow, clear, free-flowing (12.4 poise at 27°) liquid with a molecular weight (VPO) of 1410, weighed 1907 g. representing a yield of 123 lbs./eq. of catalyst. The microstructure of the resulting polybutadiene was determined by infrared analysis to be as follows: vinyl—50.1%, trans-1,4—41.2%, cis-1,4—0.1%, saturated (cyclic)—8.6%.

EXAMPLE VIII

Telomerization of 1,3-butadiene with toluene using an "in situ" n-butyllithium·n-butylpotassium complex without a cocatalyst To 400 ml. of toluene was added 1.3 g. (0.0116 mole) of potassium tert-butoxide and 3.0 ml. (0.034 mole) of concentrated (90%) n-C$_4$H$_9$Li. The solution was a turbid yellow color after stirring for 5 to 10 minutes to form the catalyst (n-C$_4$H$_9$Li)$_2$·n-C$_4$H$_9$K. 1,3-butadiene was then added as a gas at a flow rate of 3.5 liters/min. On the addition of the 1,3-butadiene, the solution became clear and dark red in color indicating the formation of the benzyl anion. The temperature rose immediately from 25° to 60° and was maintained at 60–65° throughout the reaction with external cooling. After 3 hours, the reaction was terminated by the addition of 2 ml. of water. The catalyst was still fully active. The telomeric product, a pale yellow mobile liquid with a viscosity of 2.4 poise (25°) and a molecular weight ($\overline{M}n$) of 807, weighed 2.1 kg. (yield=62 kg. per equivalent of catalyst).

EXAMPLE IX

Telomerization of 1,3-butadiene with toluene using a preformed n-butyllithium·n-butylpotassium complex The solid complex of Example IV, remaining after the hexane wash, was treated with 400 ml. of dry toluene and 5 ml. of TMEDA. After about 5 minutes of stirring a clear red solution was obtained. 1,3-butadiene gas was added as described in Example VII. After reaction was complete, the catalyst was quenched with water and the telomeric product stripped of toluene under reduced pressure. A yield of about 40 kg. of a crystal-clear liquid telomer per equivalent of catalyst was obtained.

EXAMPLE X

Telomerization of 1,3-butadiene with toluene using an n-butyllithium·n-butylsodium complex The procedure of Example VII was carried out except that the catalyst employed was that of Example III (a). The microstructure of the liquid telomerization product was as follows:

| | Percent |
|---|---|
| Vinyl | 77.8 |
| Cis-1,4 | 8 |
| Trans-1,4 | 1 |
| Saturated | 22.2 |

EXAMPLE XI

Telomerization of 1,3-butadiene using an n-butyllithium·n-butylsodium complex as a catalyst To 400 ml. of toluene was added 5 ml. of TMEDA and all of a freshly prepared complex prepared as described above in Example II(b). 1,3-butadiene was then fed to the reaction mixture at a rate of 3.5 liters/min. The temperature quickly rose from 23° to 65° and was maintained at 65° with external cooling. After 1.5 hours, the catalyst became inactive, possibly due to impurities in the butadiene. The yield of liquid product, after solvent stripping, was 450.8 g. (29.2 lbs./eq.) and possessed a viscosity of 3.8 poise at 27° and a molecular weight of 1004.

EXAMPLE XII

Telomerization of 1,3-butadiene with toluene using (C$_{10}$H$_{14}$Li$_2$·C$_{10}$H$_{14}$K$_2$) as a catalyst To 400 ml. of toluene was added 32.9 ml. of a 1.033 N solution (0.034 equivalents) C$_{10}$H$_{14}$Li$_2$ in benzene and 1.9 g. (0.017 mole) of potassium tert-butoxide. The solution was turbid yellow in color after stirring for from 5 to 10 minutes to form the catalyst (C$_{10}$H$_{14}$Li$_2$)·(C$_{10}$H$_{14}$K$_2$). 1,3-butadiene was added as a gas at a flow rate of 3.5 liters/min. On addition of the 1,3-butadiene, the solution became a clear dark red in color. The temperature rose immediately from 25° to 60° and was maintained at 60–65° throughout the reaction with external cooling. After 2¼ hours, the catalyst became inactive and the reaction was then quenched with crushed Dry Ice. The telomeric product was stripped of toluene under vacuum. The product, a pale yellow liquid (0.78 poise at 25°) with a molecular weight (VPO) of 520 weighed 1.7 kg., representing a yield of 50 kg. per equivalent of catalyst.

EXAMPLE XIII

Telomerization of 1,3-butadiene with toluene using (n-C$_4$H$_9$Li)$_2$·n-C$_4$H$_9$K as a catalyst To 400 ml. of toluene was added 1.3 g. (0.0116 mole) of potassium tert-butoxide and 3.0 ml. (0.034 mole) of concentrated n-C$_4$H$_9$Li. The solution was a turbid yellow color after stirring for 5 to 10 minutes to form the catalyst (n-C₄H₉Li)₂·n-C₄H₉K. 1,3-butadiene was then added as a gas at a flow rate of 3.5 liters/min. On addition of the butadiene, the solution became clear and dark red in color. The temperature rose immediately from 25° to 60° and was maintained at 60–65° throughout the reaction with external cooling. After 3 hours, the reaction was terminated by the addition of 2 ml. of H₂O. The catalyst was still fully active. The telomeric product was stripped of toluene under vacuum. The product, a pale yellow mobile liquid (2.5 poise at 25°) with a molecular weight (VPO) of 807 weighed 2.1 kg., representing a yield of 135 lbs. per equivalent of catalyst.

EXAMPLE XIV

Telomerization of 1,3-butadiene using n-C₄H₉Li₂·n-C₄H₉K as a catalyst to produce low molecular weight (146–400) telomer To 400 ml. of toluene was added 1.9 g. (0.017 equivalent) of potassium tert-butoxide and 3 ml. (0.034 equivalent) of concentrated (90%) n-C₄H₉Li to yield the complex n-C₄H₉Li·C₄H₉K. To this complex was added 10 ml. (0.068 equivalent) of TMEDA. Then, 1,3-butadiene was fed as a gas into a vigorously stirred mixture at a flow rate of 1.7 liters/min. The temperature of the reaction mixture rose immediately to 110° and was maintained between 110° and 120° with external cooling. After 2.75 hours, the catalyst became inactive as evidenced by cessation of 1,3-butadiene uptake by the mixture. Then, 2 ml. of water was added to the mixture and toluene was removed under vacuum. The yield of a light yellow, extremely fluid (at room temperature) oil possessing a molecular weight ($\overline{M}n$) of 320 was 850 g. (25 kg. per equivalent of catalyst). Approximately 65–70% of the telomeric product consisted of

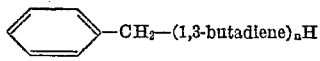—CH₂—(1,3-butadiene)ₙH with n=5, and also containing a substantial quantity of telomeric products with n=1 and 2.

EXAMPLE XV

Telomerization of 1,3-butadiene using n-C₄H₉Li·n-C₄H₉K as a catalyst to produce high molecular weight (5000) telomer To a mixture of 200 ml. of toluene and 200 ml. of n-hexane was added 1.9 g. (0.017 equivalent) of potassium tert-butoxide and 3 ml. (0.034 equivalent) of concentrated (90%) n-C₄H₉Li to yield the complex n-C₄H₉Li·n-C₄H₉K To this complex was added 5 ml. (0.034 equivalent) TMEDA. The 1,3-butadiene was fed as a gas into the vigorously stirred mixture as a flow rate of 5.1 liters/min. for a period of 3–3.5 hours. The temperature of the reaction mixture was controlled between 40 and 45° with external cooling. The reaction was quenched by addition of 2 ml. of water and the solvents were removed from the telomeric product under vacuum. The yield of a viscous light yellow oil telomeric product possessing a molecular weight ($\overline{M}n$) of 5800 (n=107) was 1800 g. (53 kg. per equivalent of catalyst).

EXAMPLE XVI

Preparation of 50:50 (by weight) cotelomer of 1,3-butadiene and α-methylstyrene

To 400 ml. of toluene there was added 1.9 g. (0.017 mole) of potassium tert-butoxide and 3 cc. (0.034 mole) of concentrated (94%) n-butyllithium to yield the catalyst complex BuK·BuLi. The catalyst concentration was then 0.085 molar. After 2–3 minutes of stirring, 5 ml. of N,N,N',N'-tetramethyl - 1,2 - ethanediamine was added. Butadiene was fed to the catalyst as a gas at 5.1 l./min. and α-methylstyrene was fed simultaneously as a liquid at 4.5 ml./min. The reaction temperature rose immediately from room temperature to 65° and was maintained between 65–70° with external cooling. After 65 min., 2 ml. of water were added to the solution to deactivate the catalyst. The toluene was removed under reduced pressure. A fluid, telomeric oil having a light yellow color was obtained whose molecular weight (VPO) was 705. The yield of telomer was 500 g.

Telomers made in accordance with the present invention which, for instance, in the case of those derived from toluene as the telogen and 1,3-butadiene as the taxogen, can be represented by the formula

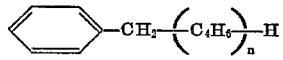—CH₂—(C₄H₆)ₙ—H as pointed out above can be made with various molecular weights and with varying properties and utilities.

Such telomers, which have a molecular weight in the range of about 145 to about 400, are very fluid oils, generally having a viscosity of less than 1 poise (at 25° C.), generally about 0.1 to 0.4, a density of about 0.9 (at 20° C.), and a pour point substantially less than 0° C., commonly —70° C. or below. Where the taxogen is 1,3-butadiene, the microstructure of the polybutadiene (C₄H₆)ₙ

H is vinyl, from approximately 40 or 45–55%; trans-1,4, from approximately 30 or 35–45%; cis-1,4, approximately 5–20% or up to about 35, and cyclic <5%, commonly almost nil. The special utilities of such telomeric oils have been pointed out above.

Those of the aforesaid telomers which have molecular weights in the range of about 400 to about 1000 are also quite fluid oils, commonly having viscosities in the range of about 0.4 to about 3 poises (at 25° C.), densities of about 0.9 (at 20° C.), and pour points substantially less than 0° C., commonly —30° to —50° C. or below. The microstructures of their polybutadiene fragments are similar to those in the approximately 145–400 molecular weight range telomers, and their special utilities are similar.

Those of the aforesaid telomers which have molecular weights in the range of about 1000 to about 1500 are also fluid oils, commonly having viscosities in the range of about 3 to about 15 poises (at 25° C.), densities of about 0.9 (at 20° C.), and pour points substantially less than 0° C., commonly in the range of about —35° to —50° C. The microstructures of their polybutadiene fragments are similar to those in the approximately 145–400 molecular weight range telomers, and their special utilities are similar. In addition, they have utility as bases for adhesives and bases for "pottings" and "castings" for encapsulation of electrical equipment.

Those of the aforesaid telomers which have molecular weights in the range of about 1500 to about 3000 are viscous oils, commonly having viscosities in the range of about 10 to about 150 poises (at 25° C.), densities of about 0.9 (at 20° C.), and pour points substantially less than 0° C., commonly in the range of about —20° to —40° C. The microstructures of their polybutadiene fragments are similar to those in the approximately 145–400 molecular weight range telomers. They are useful as bases for adhesives, as rubber plasticizers and as bases for "pottings" and "castings" for encapsulation of electrical equipment.

Those of the aforesaid telomers which have molecular weights in the range of about 3000 to about 10,000 are very viscous oils, commonly having viscosities in the range of 30 to 30,000 poises (at 50° C.), densities of about 0.9 (at 20° C.), and pour points in the range of about —20° to about +25° C. The microstructures of their polybutadiene fragments are similar to those in the approximately 145–400 molecular weight range telomers. Their special utilities are similar to those of the aforesaid telomers whose molecular weights are in the range of about 1500 to 3000.

With regard to the telomerization reactions which are carried out in accordance with the present invention, the telogens which are used are aromatic compounds, especially aromatic hydrocarbon compounds, having a side chain containing at least one hydrogen capable of being replaced by a lithium atom but devoid of any other substituents as, for instance, hydroxyl, chlorine, bromine, iodine, carboxyl, and nitro, which substituents are reactive with the organolithium compositions or complexes which are utilized as catalysts. Illustrative examples of such telogens are $C_1$–$C_4$ mono-, di- and trialkyl benzenes exemplified by toluene, ethylbenzene, n-propylbenzene, isopropylbenzene, o-, m- and p-xylenes; 1,3,5-trimethylbenzene; n-, sec- and tert-butylbenzenes; cyclohexylbenzene; alkyl, notably $C_1$–$C_4$, and cycloalkyl substituted polycyclic aromatic compounds exemplified by 1,2,3,4-tetrahydronaphthalene, 1-methylnaphthalene, 1-isopropylnaphthalene, 1,3 - isobutylnaphthalene, and 1 - cyclohexylnaphthalene; alkoxy-aromatic compounds exemplified by anisole; 1,3-dimethoxybenzene; monopropoxybenzene; 1-methoxynaphthalene and 1,3-dimethoxynaphthalene; dialkylamino-aromatic compounds, notably those in which the alkyl is $C_1$–$C_4$, exemplified by dimethylaminobenzene; 1,3-bis-(di-isopropylaminobenzene) and 1-dimethylaminonaphthalene. Especially satisfactory is toluene.

Illustrative examples of the monomeric conjugated diene and vinyl-substituted aromatic compound taxogens, which may contain from 4 to 12 carbon atoms, including those disclosed above, are isoprene; 1,3-butadiene; 2-methyl-1,3-butadiene; 2,3-dimethyl-1,3-butadiene; styrene; alpha-methylstyrene; 1,4-divinylbenzene; 1-vinylnaphthalene and 2-vinylnaphthalene. Numerous other examples can also be used, many of which are shown, for instance, in U.S. Pat. No. 3,091,606 which, for this showing, is herewith incorporated by reference.

It may be pointed out that it has heretofore been disclosed, as shown in U.S. Pat. No. 3,356,754 and the aforementioned U.S. Pat. No. 3,294,768, to prepare liquid conjugated diene polymers, and polymers (copolymers) of conjugated dienes with vinyl-substituted aromatic hydrocarbons, utilizing as catalyst systems, e.g. (a) certain organolithium compounds such as n-butyllithium and (b) certain organoalkali metal compounds (where the alkali metal is sodium, potassium, rubidium or cesium) such as potassium tert-butoxide. In said U.S. Pat. No. 3,356,754, the liquid polymers are prepared by reacting the monomer, or mixture of monomers, in the presence of said catalyst system, and in the presence of a diluent comprising at least 30 weight percent of an alkyl-substituted aromatic hydrocarbon such as toluene. As described in said patent, particularly in column 6 thereof, and in the working examples, the reaction is carried out under conditions where all of the monomer employed is present at the time that the polymerization reaction is initiated and is being carried out. When liquid polymers are produced by following procedures described in said Pat. No. 3,356,754, using 1,3-butadiene as the monomer and toluene the diluent, products are obtained in which there is a much narrower distribution of polymer molecular weights than in typical liquid telomers of our invention (e.g. MWD=1.0 to 1.5 for Pat. No. 3,356,754 products vs. 2 to 4 for products of our invention). It may also be noted that, generally speaking, catalyst usage in accordance with our invention, is more economical than in the case of the procedures shown in said Pat. No. 3,356,754.

The foregoing facts have been demonstrated by illustrative runs made using formulations or recipes and procedures of said Pat. No. 3,356,754; and formulations and procedures of our invention, utilizing typical catalyst concentrations. For convenience, when reference is made to "Patent," it will be understood to refer to Pat. No. 3,356,754; and, when reference is made to "Lithene," it will be understood to refer to liquid telomers or resins made in accordance with our invention.

Runs 2936 and 2960 correspond to those shown in said Pat. No. 3,356,754 in Example III thereof, Recipe 1, Table III, Entry 2; and Runs 2937 and 2955 correspond to said patent, Example VIII, Table VIII, Entry 4, but using typical catalyst concentrations as disclosed in the present application. In the foregoing runs, all of the 1,3-butadiene charge to be polymerized was initially placed in the reactor. In the typical Lithene runs, 2938, 2955, 2961, Example XIII of the present application, and a Lithene Plant run (PH97F) (Tables A, B and C below), the 1,3-butadiene was added gradually over a period of time.

TABLE A.—REACTION VARIABLES

| Run No. | BD [1] charge | Toluene charge (ml.) | Initial catalyst conc. (moles/l.) | Yield, percent (on BD) | Yield, lbs./ equiv. catalyst |
|---|---|---|---|---|---|
| 2,936 | I | 1,000 | 0.034 | 95 | 6.2 |
| 2,937 | I | 350 | 0.097 | 98 | 6.4 |
| 2,938 | II | 1,000 | 0.034 | 98 | 6.8 |
| 2,955 | I | 300 | 0.113 | 97 | 6.3 |
| 2,956 | II | 300 | 0.113 | 99 | 6.5 |
| 2,960 | I | 1,000 | 0.034 | 92 | 6.0 |
| 2,961 | II | 1,000 | 0.034 | 100 | 6.7 |
| Ex. XIII of present application. | III | 400 | 0.085 | 100 | 135 |
| PH97F | IV | | 0.037 | 95 | 80 |

[1] 1,3-butadiene: I=100 grams BD in pot at start; reaction temp.=50° C. II=100 grams BD fed gradually as a gas; reaction temp.=50° C. III=2 kg. of BD fed gradually as a gas. IV=Plant run, ratio of BD to toluene=1.34 grams/ml. BD fed gradually as a gas.

TABLE B.—PROPERTIES

| | Mol. wt. | | n 25° C. poise | Phenyl [b] groups per chain | MWD [c] | Microstructure [d] | |
|---|---|---|---|---|---|---|---|
| Run No. | VPO | NMR [a] | | | | 1,4 | 1,2 |
| 2,936 | 1,100 | 2,200 | 25.9 | 0.5 | 1.3 | 48 | 52 |
| 2,937 | 1,600 | 16,000 | 94.9 | 0.1 | 1.1 | 43 | 57 |
| 2,938 | 830 | 1,000 | 9.1 | 0.8 | 2.6 | 51 | 49 |
| 2,955 | 2,600 | >100M | 27.8 | <<0.1 | 1.1 | 45 | 55 |
| 2,956 | 1,200 | 1,554 | 8.5 | 0.8 | 3.4 | 56 | 44 |
| 2,960 | 1,800 | 8,213 | 11.8 | 0.2 | 1.2 | 54 | 46 |
| 2,961 | 790 | 904 | 2.6 | 0.9 | 3.2 | 57 | 43 |

NOTE.—Footnotes follow Table C.

TABLE C.—PROPERTIES OF TYPICAL LITHENE RESINS

| | Mol. wt. | | n 25° C. poise | Phenyl [b] groups per chain | MWD [c] | Microstructure [d] | |
|---|---|---|---|---|---|---|---|
| Run No. | VPO | NMR [a] | | | | 1,4 | 1,2 |
| "L" series: | | | | | | | |
| 92 | 990 | 860 | 3.0 | 1.1 | 3.7 | 51 | 49 |
| 93 | 860 | 820 | 2.0 | 1.0 | 3.6 | 51 | 49 |
| 94 | 825 | 760 | 1.9 | 1.1 | 4.1 | 49 | 51 |
| 95 | 940 | 929 | 2.5 | 1.0 | 3.7 | 48 | 52 |
| 96 | 900 | 820 | 2.3 | 1.1 | 3.7 | 51 | 49 |
| "M" series: | | | | | | | |
| 45 | 1,300 | 1,457 | 7.0 | 0.9 | | 48 | 52 |
| 68 | 1,000 | 1,236 | 6.6 | 0.8 | | 47 | 53 |
| 75 | 1,300 | | 6.4 | | 3.7 | 48 | 52 |
| 79 | 1,750 | 1,368 | | 1.3 | | 50 | 50 |
| "H" series: | | | | | | | |
| 80 | 3,100 | 2,800 | 161 | 1.1 | | 49 | 51 |
| 83 | 3,000 | 3,432 | 144 | 0.9 | | 50 | 50 |
| 85 | 2,500 | 2,870 | 60 | 0.9 | 4.3 | 49 | 51 |
| 97F | 2,700 | 2,210 | 85 | 1.2 | 4 | 47 | 53 |

Legend, Tables B and C

[a] Molecular weight calculated on ratio of phenyl hydrogens to all other hydrogens.
[b] Calculated by dividing VPO molecular weight by NMR molecular weight.
[c] MWD=molecular weight distribution or polydispersity—calculated by dividing width of GPC curve at half height by 2—width at half height of GPC curve of a liquid polybutadiene prepared by a typical anonic "living" polymerization.
[d] By NMR, Normalized to 100% of unsaturation.

In the case of Runs 2936, 2937, 2955 and 2960, the products produced did not correspond to typical Lithenes although butadiene conversions to polymer were high. The molecular weight distributions of the major product were much narrower than a typical Lithene. Although some chain transfer to toluene occurred (see Tables A, B, Column 5), the distribution was more like that of a typical "living" polymerization, in which the chain ends are not destroyed, i.e. MWD's close to 1.0. Consequently, because little or no chain transfer occurred in such "living" polymerization, molecular weights were higher than in typical Lithene runs (see Table B). In contrast, Run 2938, which differed from Run 2936 only in the nature of the butadiene charging, i.e. gradual, continuous feed, vs. "all-in-the-pot," possessed the typical broad Lithene distribution indicating extensive chain-transfer (note also Run PH97F). This was corroborated by the presence of nearly one phenyl group polybutadiene chain (see said Tables B and C) and a lower molecular weight than Run 2936. The molecular weight of Run 2938 was lower than in Run 2936.

It may be noted, as shown by such illustrative telomerization examples as Examples VIII and XIII of our present application, that it is particularly advantageous that the butadiene feed be continued for such a period of time that a total of several times the amount of butadiene is added per unit amount of toluene, most desirably of the order of 3 to 5 parts by weight of butadiene to 1 part by weight of toluene, which represents a highly desirable procedure from an economic standpoint. However, excellent results are also obtained where the amount of butadiene added to the toluene is as low as about 1 and as high as about 10 parts by weight to 1 part by weight of toluene. The foregoing is in sharp contrast to the disclosure in Pat. No. 3,356,754 where the toluene exceeds and, generally, greatly exceeds the amount of butadiene used in the production of the polymers. In this same connection, it may be pointed out that it would be impossible, following the procedures described in said patent, to make polymers using weight ratios of 3 to 5 of butadiene to 1 of toluene because control of the reaction could not reasonably be effected and explosive reactions would result. Should successive additional "one-shot" charges of butadiene be added to the runs disclosed in said Pat. No. 3,356,754 in order to attempt to approximate the process of our invention, the resulting products, generally, would eventually no longer be liquids at room temperature since continued chain growth rather than chain transfer would result leading to undesirably higher molecular weight products in contrast to the products obtained by the process of our invention. In the practice of the process of our invention, the concentration of butadiene in the reaction mixture at any given time, and under all times, is very low, generally slightly over zero, thus indicating a very rapid reaction to produce the telomers.

It may be noted that, in the practice of the process of our invention, it is highly advantageous that at the beginning of the reaction, that is, at substantially the start of the gradual addition of the taxogen, for instance, the 1,3-butadiene, there is present initially a relatively high concentration of the catalyst in the reactor. This makes for rapid initiation of the reaction and effectively provides for the desired reaction being carried out most desirably from batch to batch. At the conslusion of the addition of the taxogen, the catalyst concentration will have been reduced to a low value in the reactor. In this same connection, it may be observed that catalyst concentration plays a definite role in the microstructure of the finished telomer.

What is claimed is:

1. A process of preparing normally liquid resin telomers which comprises providing a solution containing (a) an aromatic compound telogen having at least one active hydrogen in a side chain capable of being replaced by a lithium atom but devoid of any other substituents which are reactive with the organolithium compound defined hereafter, and (b) a catalyst in the form of a complex of at least one organolithium with at least one organometallic compound in which the metal of said organometallic compound is selected from the group of sodium, potassium, rubidium and cesium, the organo radicals of said organolithium and said organometallic compound being $C_2$–$C_{18}$ hydrocarbon radicals selected from the group of alkyl, cycloalkyl, aryl, alkylaryl, cycloalkylaryl, heterocyclic, ethylenically unsaturated organo radicals, alkylene, and polyenes, and gradually adding thereto, over a period of time, a monomer taxogen selected from the group consisting of conjugated dienes and vinyl-substituted aromatic compounds to produce a liquid telomer having approximately one aromatic nuclear group per polymer chain of said monomer, and having a molecular weight distribution between 2 and 6.

2. A process according to claim 1, in which the telogen is toluene and the taxogen is 1,3-butadiene.

3. A process according to claim 2, in which the organolithium compound is a $C_3$–$C_6$ alkylithium.

4. A process according to claim 3, in which the alkyllithium is n-butyllithium.

5. A process according to claim 4, in which the organometallic compound is a member selected from the group of n-butylsodium and n-butylpotassium.

6. A process according to claim 2, in which the organolithium is n-butyllithium.

7. A process according to claim 6, in which the organometallic compound is n-butylpotassium, and in which the added taxogen is used in an amount of 1 to 10 parts to 1 part of the telogen, said parts being by weight.

8. A process according to claim 2, in which the organolithium is a dilithioaduct of a conjugated diene selected from the group of isoprene and 1,3-butadiene, and the organometallic compound is a member selected from the group of disodiumadducts and dipotassiumadducts of a conjugated diene selected from the group of isoprene and 1,3-butadiene.

9. A process of preparing normally liquid resin telomers which comprises providing a solution containing toluene and a catalyst system resulting from the reaction of n-butyllithium and potassium tert-butoxide, and gradually adding thereto gaseous butadiene over a period of time to produce a liquid telomer having approximately one phenyl group per butadiene polymer chain, and having a molecular weight distribution between 2 and 6.

10. A process of preparing normally liquid resin telomers which comprises providing a solution containing toluene and a catalyst system resulting from the reaction of n-butyllithium and potassium tert-butoxide, and gradually adding thereto gaseous 1,3-butadiene over a period of time to produce a liquid telomer having approximately one phenyl group per butadiene polymer chain, the weight ratio of the 1,3-butadiene added to the toluene being 1 to 10 of the 1,3-butadiene to 1 of the toluene.

11. A process according to claim 10, in which said weight ratio is 3 to 5 of the 1,3-butadiene to 1 of the toluene.

12. A normally liquid telomer of (a) an aromatic compound telogen having at least one active hydrogen in a side chain capable of being replaced by a lithium atom but devoid of any other substituents which are reactive with the organolithium compound defined hereafter, with (b) a monomer taxogen selected from the group consisting of conjugated dienes and vinylsubstituted aromatic compounds, and resulting from the gradual addition of the (b) ingredient to the (a) ingredient, over a period of time, in a hydrocarbon solvent solution containing a complex of at least one organolthium with at least one organometallic compound in which the metal of said organometallic compound is selected from the group of sodium, potassium, rubidium and cesium, the organo radicals of said organolithium and said organometallic compound being $C_2$–$C_{18}$ hydrocarbon radicals selected from the group of alkyl, cycloalkyl, aryl, alkylaryl, cycloalkylaryl, heterocyclic, ethylenically unsaturated organo radicals, alkylene, and polyenes, said liquid telomer having approximately one aromatic nuclear group per polymer chain of said monomer, and having a molecular weight distribution between 2 and 6.

13. A normally liquid telomer according to claim 12, in which the telogen is toluene and the taxogen is 1,3-butadiene.

14. A normally liquid telomer according to claim 13, in which the organolithium compound is a $C_3$–$C_6$ alkyl-lithium.

15. A normally liquid telomer according to claim 14, in which the alkyllithium is n-butyllithium.

16. A normally liquid telomer according to claim 15, in which the organometallic compound is a member selected from the group of n-butylsodium and n-butyl-potassium.

17. A normally liquid telomer according to claim 12, in which the added taxogen is used in an amount of 1 to 10 parts to 1 part of the telogen, said parts being by weight.

18. A normally liquid telomer according to claim 17, in which the organometallic compound is a member selected from the group of n-butylsodium and n-butyl-potassium.

19. A normally liquid telomer according to claim 13, in which the organolithium is a dilithioadduct of a conjugated diene selected from the group of isoprene and 1,3-butadiene, and the organometallic compound is a member selected from the group of disodiumadducts and dipotassiumadducts of a conjugated diene selected from the group of isoprene and 1,3-butadiene.

20. A normally liquid telomer of toluene and 1,3-butadiene and resulting from the gradual addition of the 1,3-butadiene to a liquid hydrocarbon solution comprising toluene and a catalyst system resulting from the reaction of n-butyllithium and potassium tert-butoxide, said telomer containing approximately one phenyl group per butadiene polymer chain, and having a molecular weight distribution between 2 and 6.

21. A normally liquid telomer of toluene and 1,3-butadiene and resulting from the gradual addition of the 1,3-butadiene to a liquid hydrocarbon solution comprising toluene and a catalyst system resulting from the reaction of n-butyllithium and potassium tert-butoxide, said telomer containing approximately one phenyl group per butadiene polymer chain, the weight ratio of the 1,3-butadiene to the toluene forming said telomer being 1 to 10 of the 1,3-butadiene to 1 of the toluene.

22. A normally liquid telomer according to claim 21, in which said weight ratio is 3 to 5 of the 1,3-butadiene to 1 of the toluene.

23. A normally liquid telomer according to claim 21 which has a molecular weight in the range of about 145 to about 400, a viscosity in the range of about 0.1 to about 0.4 poise (at 25° C.), a density about 0.9 (at 20° C.), and a pour point of about −70° C. or below; and the microstructure of the polybutadiene fragment of said telomer is vinyl, approximately 40–55%; trans-1,4, approximately 30–45%; cis-1,4 approximately 5–20%; and cyclic les than 5%.

24. A normally liquid telomer according to claim 21 which has a molecular weight in the range of about 400 to about 1000, a viscosity in the range of 0.4 to 3 poises (at 25° C.), a density in the range of about 0.9 (at 20° C.), and a pour point of about −50° C. or below; and the microstructure of the polybutadiene fragment of said telomer is vinyl, approximately 40–55%; trans-1,4, approximately 30–45%; cis-1,4, approximately 5–35%; and cyclice less than 5%.

25. A normally liquid telomer according to claim 21, which has a molecular weight in the range of about 1000 to about 1500, a viscosity in the range of 3 to 15 poises (at 25° C.), a density of about 0.9 (at 20° C.), and a pour point in the range of about −35° to −50° C.; and the microstructure of the polybutadiene fragment of said telomer is vinyl, approximately 40–55%; trans-1,4, approximately 30–45%; cis-1,4, approximately 5–35%; and cyclic less than 5%.

26. A normally liquid telomer according to claim 21, in the form of a viscous oil which has a molecular weight in the range of about 1500 to about 3000, a viscosity in the range of 10 to 150 poises (at 25° C.), a density of about 0.9 (at 20° C.), and a pour point in the range of about −20° to −40° C; and the microstructure of the polybutadiene fragment of said telomer is vinyl, approximately 40–55%; trans-1,4, approximately 30–45%; cis-1,4, approximately 5–35%; and cyclic less than 5%.

27. A normally liquid telomer according to claim 21, in the form of a viscous oil which has a molecular weight in the range of about 3000 to about 10,000, a viscosity in the range of 30 to 30,000 poises (at 50° C.), a density of about 0.9 (at 20° C.), and a pour point in the range of −20° to about +25° C.; and the microstructure of the polybutadiene fragment of said telomer is vinyl, approximately 40–55%; trans-1,4, approximately 30–45%; cis-1,4, approximately 5–20%; and cyclic less than 5%.

28. A normally liquid telomer according to claim 21, in which α-methylstyrene is also gradually added essentially simultaneously with the 1,3-butadiene but in a lesser total proportion than the 1,3-butadiene.

References Cited
UNITED STATES PATENTS

| | | | |
|---|---|---|---|
| 3,006,976 | 10/1961 | Shaw et al. | 260—668 B |
| 3,458,586 | 7/1969 | Langer | 260—668 B |
| 3,468,970 | 9/1969 | Screttas | 260—668 B |
| 3,652,723 | 3/1972 | Makowski et al. | 260—669 P |

CURTIS R. DAVIS, Primary Examiner

U.S. Cl. X.R.

260—668 R, 669 P